United States Patent
Venemans

(10) Patent No.: US 6,850,881 B1
(45) Date of Patent: Feb. 1, 2005

(54) ATM CONNECTION ADMISSION CONTROL DEVICE FOR DBR CONNECTIONS

(75) Inventor: Pieter Hendrik Albert Venemans, Delft (NL)

(73) Assignee: Koninklijke KPN N.V., The Hauge (NL)

(*) Notice: Subject to any disclaimer, the term of this patent is extended or adjusted under 35 U.S.C. 154(b) by 0 days.

(21) Appl. No.: 09/806,738

(22) PCT Filed: Oct. 11, 1999

(86) PCT No.: PCT/EP99/07773

§ 371 (c)(1),
(2), (4) Date: May 24, 2001

(87) PCT Pub. No.: WO00/22785

PCT Pub. Date: Apr. 20, 2000

(30) Foreign Application Priority Data

Oct. 12, 1998 (NL) .............................. 1010295

(51) Int. Cl.[7] .......................... G06F 15/16; H04L 12/26
(52) U.S. Cl. ......................... 703/234; 370/232; 370/233
(58) Field of Search ............................... 370/395.2, 218, 370/230, 232, 233, 360, 395.1; 709/234, 235

(56) References Cited

U.S. PATENT DOCUMENTS

| | | | |
|---|---|---|---|
| 5,959,991 A * | 9/1999 | Hatono et al. | 370/235.1 |
| 5,970,064 A * | 10/1999 | Clark et al. | 370/351 |
| 6,212,163 B1 * | 4/2001 | Aida | 370/230 |
| 6,314,085 B1 * | 11/2001 | Saranka | 370/230 |
| 6,324,165 B1 * | 11/2001 | Fan et al. | 370/232 |
| 6,438,134 B1 * | 8/2002 | Chow et al. | 370/412 |
| 6,452,905 B1 * | 9/2002 | Smith et al. | 370/236.1 |
| 6,459,681 B1 * | 10/2002 | Oliva | 370/232 |
| 6,665,264 B1 * | 12/2003 | Davison et al. | 370/230 |
| 6,754,206 B1 * | 6/2004 | Nattkemper et al. | 370/369 |
| 2004/0042400 A1 * | 3/2004 | Horlin et al. | 370/232 |

FOREIGN PATENT DOCUMENTS

WO    WO 9701895 A2 * 1/1997

OTHER PUBLICATIONS

Zukerman et al., "A measurement based connection admission control for ATM networks," Proc. ICATM '98, Jun. 1998.*

Tham et al., "Multi–service connection admission control using modular neural networks", In Proceedings of the Conference on Computer Communications, IEEE Infocom, San Francisco, California 1998.*

* cited by examiner

*Primary Examiner*—William A. Cuchlinski, Jr.
*Assistant Examiner*—Yemane M. Gerezgiher
(74) *Attorney, Agent, or Firm*—Frishauf, Holtz, Goodman & Chick, P.C.

(57) ABSTRACT

A device for Connection Admission Control for an ATM switch, intended for admitting to the switch a requested ATM connection of the DBR type, such that the "Quality of Service" of all ATM connections of the DBR type in said switch continues to satisfy certain conditions. For the composite traffic stream of DBR connections at an output port with capacity C, a single buffer with capacity B is available, while as boundary condition it holds that the total average load of the output port does not amount to more than $\rho \times C$, where $\rho$ is a constant with a value between 0 and 1. The CAC device comprises two sub-devices, which each execute a—rather complex—partial calculation, resulting in a positive or negative admission signal. The new ATM connection is only granted admission to the switch if both sub-devices emit a positive admission signal.

1 Claim, 5 Drawing Sheets

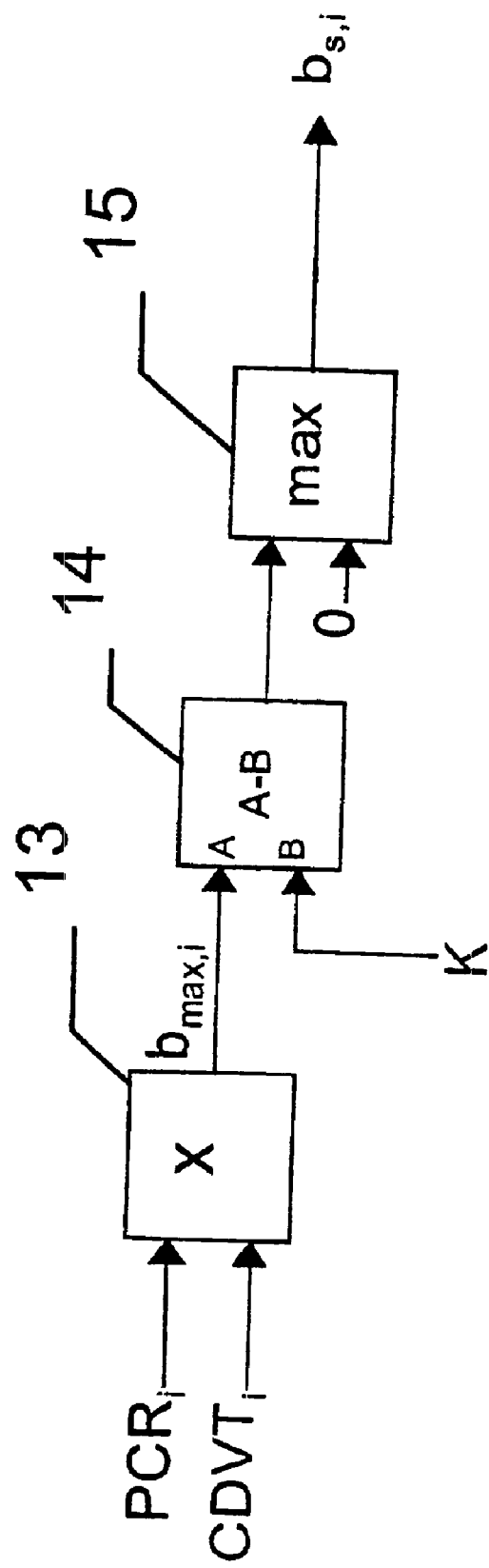

ATM CONNECTION ADMISSION CONTROL DEVICE FOR DBR CONNECTIONS

This application is a U.S. National Phase Application under 35 USC 371 of International Application PCT/EP99/07773 (published in English) filed Oct. 11, 1999.

BACKGROUND OF THE INVENTION

The invention is related to a device for Connection Admission Control (CAC) for an ATM switch, intended for admitting to said ATM switch an additional traffic stream, via an additional ATM connection of the DBR type, such that the "Quality of Service" of all DBR connections in said switch continues to meet certain conditions, a single buffer with capacity B being available for the composite traffic stream of all DBR connections at an output port with capacity C, while, as boundary condition, the total average load of the output port does not amount to more than ρ×C, where ρ is a constant with a value between 0 and 1.

General

Asynchronous Transfer Mode (ATM) is a network technique allowing connections to be made in a uniform manner with varying characteristics. The transport of data takes place by means of uniform cells with a length of 53 octets. With the aid of ATM, connections can be established with varying network guarantees with respect to cell loss, cell delay, cell delay variation and throughput by selecting a "Quality of Service" (QoS) class [I.356] and an "ATM Transfer Capability" (ATC) [I.371].

Guaranteeing the values of the QoS parameters in advance is a characteristic which is focussed upon in ATM networks. In order to satisfy certain (possibly very stringent) requirements with respect to the Quality of Service in advance, including the cell loss probability, a decision must be made for each requested connection whether the latter can or cannot be admitted to an ATM switch. Connections are only admitted if the Quality of Service of the connections which make use of the ATM switch do not exceed the limits set in advance. The entirety of methods which determine admittance or non-admittance of a requested ATM connection is called a Connection Admission Control (CAC) algorithm, a device for executing a CAC algorithm being called a CAC device.

The said "ATM Transfer Capability" (ATC) describes the parameters by which an ATM connection is characterised. The ATC referred to here comprises the "Deterministic Bit Rate" (DBR) which is established in [I.371]. In this case, an ATM connection is characterised by two parameters: the Peak Cell Rate (PCR) and the Cell Delay Variation Tolerance (CDVT). The PCR represents the maximum speed at which a connection may drive cells; the CDVT is a measure for the tolerance in the PCR. The entity CDVT denotes the degree in which the actual speed may exceed the PCR during (as a rule very short) periods of time. In order to guarantee the Quality of Service of all connections, a Usage Parameter Control (UPC) device monitors whether each of the connections indeed satisfies its characteristic during the operating period of a connection. If this is not the case, then the UPC device can resort to removing cells of the related connection from the traffic stream.

The invention relates, as indicated above, to a device which can be used for the CAC of an ATM switch, and indeed in particular for connections which satisfy the specifications of the "Deterministic Bit Rate" Transfer Capability.

THE PRIOR ART

A simple but inaccurate method for executing CAC for connections which are characterised by values for PCR and CDVT, is leaving the last parameter completely out of consideration. The method then restricts itself to determining whether sufficient capacity is available for the sum of the peak cell rates of the connections at the related output port. In this case, two matters are disregarded:

The fact that the traffic streams of the various connections consist of discrete cells, instead of continuous streams. As a result, several cells can be routed to one specific output port at (approximately) the same time when various traffic streams are mixed. In order to prevent cell loss in such situations, it is customary to use an output buffer. The said simple method for CAC, however, does not take into account the consequences of such a buffer, such as cell loss as a result of a finite buffer capacity and delay.

The fact that the traffic streams of the various connections can show fluctuations, in which case the momentary cell rate can temporarily exceed the nominal peak cell rate. Said fluctuations are possible if the Cell Delay Variation Tolerance (CDVT) of the connections is greater than zero. Through said fluctuations it is possible that, when an output buffer is used, the required amount of buffer capacity is, in reality, greater than that for "ideal" DBR connections (with CDVT being equal to 0). This can lead to unforeseen cell loss and/or extra delay.

The literature describes a number of methods in which the above-mentioned two problems are recognised and both the discrete character of ATM traffic streams as well as the fact that the momentary cell rate of a connection can temporarily exceed its PCR are taken into account. In [E.736] it is described that this problem can be solved by either "shaping" all traffic streams (that is to say, delaying cells in such a way that the cells of the resulting traffic streams have an intermediate arrival time of exactly 1/PCR). The resulting traffic stream can then be characterised by a CDVT which is equal to 0.

In the aforementioned reference, the "maximum burst rate is introduced of a connection which is characterised by values for PCR and CDVT. Said maximum burst rate is the required buffer capacity to lead the related traffic stream, in an ideal situation and without cell loss, over an imaginary buffer (without mixing of other traffic streams), assuming that the said imaginary buffer has a constant exit speed equal to PCR.

In [Gravey97] a solution with "shaping" is also proposed, albeit that connections are shaped such that their maximum burst rate is limited and small (smaller than or equal to 2).

A disadvantage of said methods is that "shaping" is not possible with all ATM switches and that introducing extra shapers in the network can be undesirable. For these reasons, [E.736] also describes a method for the case that connections have a known maximum burst rate, $b_{max}$. Said connections are then approximated by a $b_{max}$ batch Poisson process. This method has the disadvantage of (1) the Poisson process being an over-estimation of the traffic, which leads to less connections being able to be admitted than is actually possible on the basis of the required QoS guarantees, and (2) the assumption of an unequivocally determined $b_{max}$ for all connections, which can be unnecessarily inefficient in practice. In practice, namely, said value for $b_{max}$ could be quite high. In [Gravey97] it is shown that the maximally allowable load of the ATM network decreases for increasing values of $b_{max}$.

[COST242] describes the method essentially as in [E.736], but refines it. The maximum batches which are used for approximation by Poisson batches do not always need to be the same as in [E.736], but are dependent upon the speed of the multiplexer. For a universally valid model, the batches must indeed be just as large as those of a Poisson process by which the traffic stream is approximated.

[Mignau96] describes methods which are not based on the Poisson method but on the NxD/D/1- method, which is described below. For sources in which the maximum burst rate can assume exactly two values, a complex model is described in [Cidon95]. Said model is numerically unstable, however, and requires long calculation times.

The NxD/D/1-model.

One of the models on which the present invention is based is the NxD/D/1- model. This model provides the probability distribution of the length of the queue in a system consisting of a buffer which is controlled by one server. Said system is supplied by N ideal (i.e. CDVT equal to 0) and equal traffic streams, each having an inter-cell arrival time of magnitude D and with initial starting times uniformly distributed over an interval of magnitude D. The unit of time is the time required to control one cell. In [Cost242] it is put forward that the probability of the buffer use exceeding a certain value B is equal to:

$$\sum_{n=B+1}^{N} \binom{N}{n} \left(\frac{n-B}{D}\right)^n \left(1 - \frac{n-B}{D}\right)^{N-n} \frac{D-N+B}{D-n+B}.$$

This formula will be designated here by $Q_D^N(B)|$. In [COST242] it is also put forward that this formula also provides a good upper limit for the probability of excess if the streams have different inter-cell arrival times.

SUMMARY OF THE INVENTION

The invention seeks to provide in a device of the kind indicated in the preamble, which is pre-eminently suitable as CAC for ATM connections of the DBR type, in which both the discrete character of the traffic streams as well as the fact that the cell rate of each of the individual connections can show fluctuations above its nominal peak cell rate are taken into account. It distinguishes itself favourably from CAC devices based on the methods in the literature with respect to the following aspects:

More efficient: the device according to the invention has the property that the maximum number of connections able to be mixed is not limited much more than strictly necessary to prevent buffer overflow and thereby cell loss.

Better suited to practical situations: in the current ATM networks, it is customary to select the CDVT such that this is a constant when it is expressed in the unit of time, which has as a result that the previously defined maximum burst rate $b_{max}$ is dependent upon the peak cell rate of the connection; for this reason no unequivocal maximum burst rate can be established, which is a point of departure for the methods in the literature.

Better practical applicability: the method used by the device according to the invention is practically applicable, numerically stable and has a faster calculation time.

Although the methods in the literature are also practically applicable, the CAC device according to the invention combines a high efficiency with practical applicability. The CAC device according to the invention also provides the possibility of optimising the maximum number of allowable connections by selecting a certain value for the freely selectable constant K, albeit that this must be a whole number greater than or equal to 0. In many cases, the optimal value for K will depend on the most frequently occurring values of the CDVT of the ATM connections.

The CAC device according to the invention comprises two sub-devices, each issuing a positive or negative result (signal).

The result of the whole device will be positive only if both sub-devices issue a positive result (signal), and only then will a new connection to the ATM switch be grantable. The first sub-device determines whether sufficient bandwidth is available for the set of connections V, of which each connection vi is characterised by values for $PCR_i$ and $CDVT_i$, which, after possible admission of the new connection, will make use of a certain output port; the second sub-device determines whether the available buffer capacity for the related port is sufficient.

The first sub-device comprises:

An arithmetic unit which determines the sum (ΣPCR) of the values of $PCR_i$ of each of the connections $v_i$ of the set V. Said sum is subsequently compared with the product of ρ and C. If the said sum is less than or equal to said product, then the result of the sub-device is positive; otherwise the result is negative.

The second sub-device comprises:

An arithmetic unit which calculates a certain buffer size $b_{S,i}$ for each of the connections $v_i$ of the set V. Said buffer size is equal to either $b_{max,i}$ minus the constant value K if $b_{max,i}$ is greater than or equal to K, or equal to 0 if $b_{max,i}$ is less than K. For buffer size $b_{max,i}$ it holds that it is possible, in an ideal situation, to conduct the related traffic stream without cell loss over an imaginary buffer with buffer size $b_{max,i}$ and exit speed $PCR_i$ (without mixing with other traffic streams). $b_{max,i}$ is calculated by the device by determination of the product of $PCR_i$ and $CDVT_i$.

An arithmetic unit which determines the sum of the calculated values $b_{S,i}$ for all connections of the set V. Said sum will be designated here by $B_S$.

An arithmetic unit which determines a buffer size $B_N$, for which it holds that it is possible to multiplex N imaginary, identical traffic streams with constant cell rate, using a buffer of size $B_N$, and indeed such that the probability of cell loss as a result of buffer overflow will not exceed the given value of ε. N is here the number of connections in set V. It is also assumed that the average degree of occupation at the output of the buffer is equal to ρ. The buffer capacity $B_N$ is determined by application of the previously introduced NxD/D/1 model, where the probability of a buffer level of B cells being exceeded is designated by $Q_D^N(B)|$. The arithmetic unit determines the lowest value of B, such that $Q_D^N(B)| \leq \epsilon$, where N is equal to the number of sources, D is equal to N/ρ and $Q_D^N(B)|$ is the formula as given above or a sufficiently accurate approximation thereof. The value of B found in this way forms the value of $B_N$.

An arithmetic unit which multiplies the calculated value $B_N$ by the constant K. For this result, to be referred to here as $B_{NK}$, it holds that it is possible to multiplex N imaginary, identical traffic streams, each with a burst rate of K, using a buffer of size $B_{NK}$, such that the probability of cell loss as a result of buffer overflow will not exceed the given value of ε. In this regard it will be assumed that the average degree of occupation at the output of the buffer is equal to ρ.

An arithmetic unit which determines the sum of the calculated values for $B_S$ and $B_{NK}$. Said value is designated here by $B_R$.

A device which compares the calculated value of $B_R$ with the given capacity B of the output buffer. If the value of $B_R$ is less than or equal to B, then the result of the sub-device is positive; if the value of $B_R$ is greater than B, then the result of the sub-device is negative.

The operation of the device will be further explained hereinafter with reference to an implementation example.

BRIEF DESCRIPTION OF THE DRAWINGS

FIG. 5 shows the processor 7 of FIG. 4 in greater detail.

DETAILED DESCRIPTION

Figure 1:
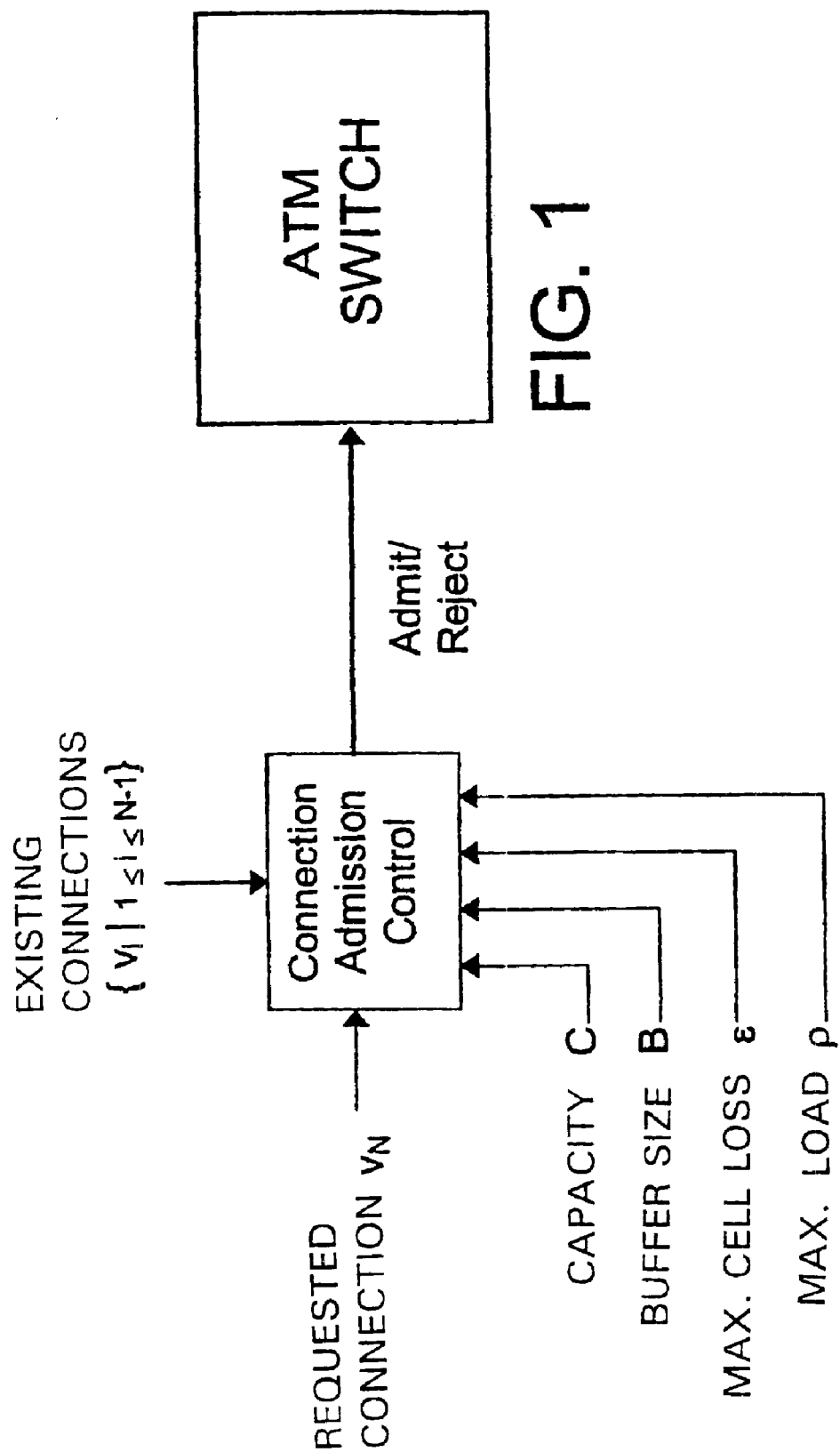
FIG. 1 is a block diagram of a CAC device in general.

FIG. 1 shows a CAC device in general. The traffic parameters (PCR and CDVT) of an arbitrary number of already existing ATM connections $v_1 \ldots v_{N-1}$ are supplied to the CAC device, as well as the traffic parameters of a newly requested ATM connection $v_N$. A maximally allowable cell loss probability parameter $\epsilon$ is furthermore supplied, as well as the applicable buffer capacity B and link capacity C. A maximally allowable degree of occupation $\rho$ is also supplied. The result of the device is an admit/reject" signal, on the basis of which the requested ATM connection $V_N$ is or is not admitted to the ATM switch.

Figure 2:
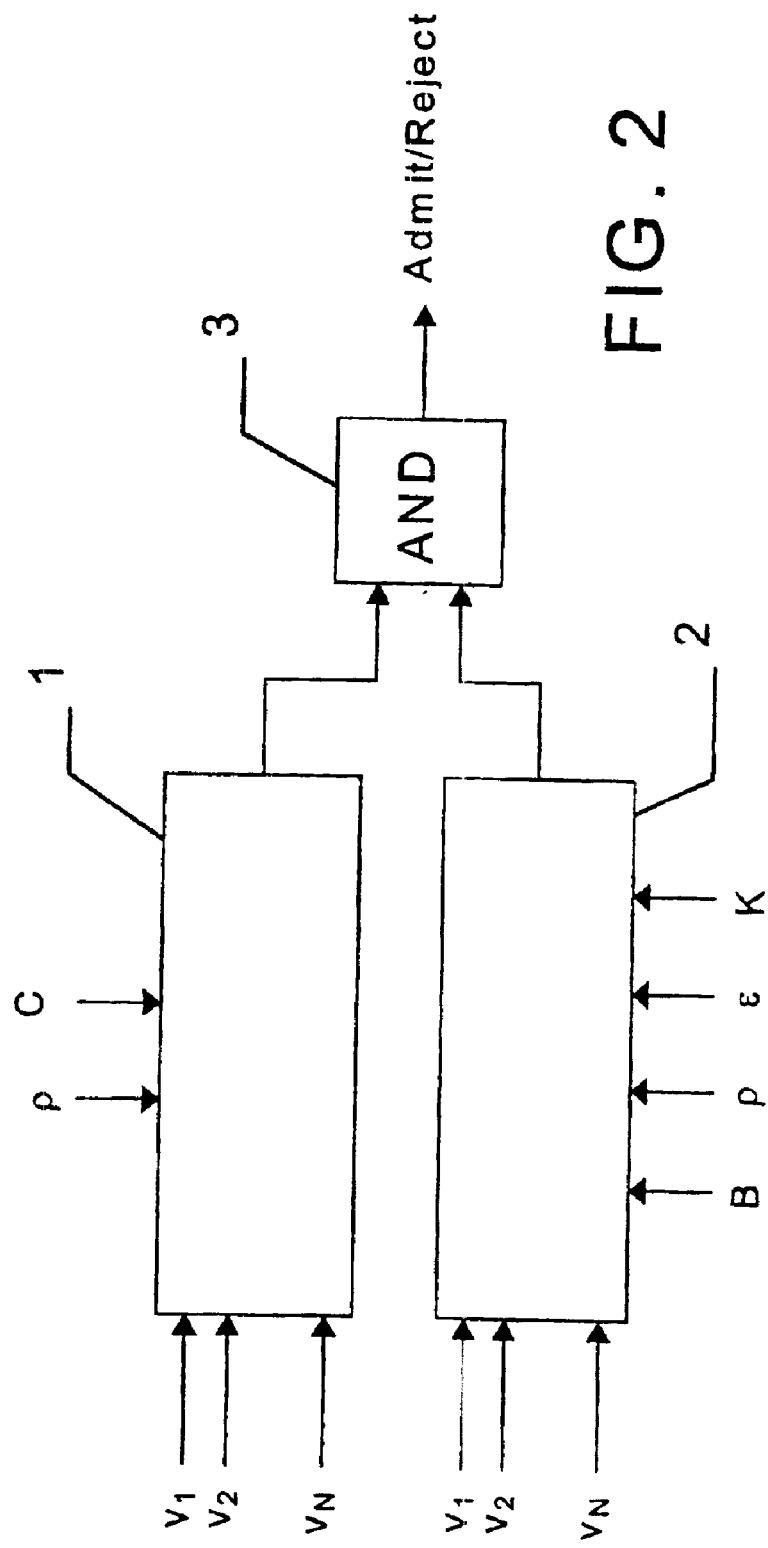
FIG. 2 diagrammatically shows the CAC device of FIG. 1.

FIG. 2 shows a diagrammatic overview of a CAC device according to the invention. The CAC device is composed of a sub-device 1 and a sub-device 2. Each sub-device can emit a positive ("admit") or a negative ("reject") signal. Both signals are supplied to a logical AND port 3, of which the output signal is only positive if both input signals are positive.

Figure 3:
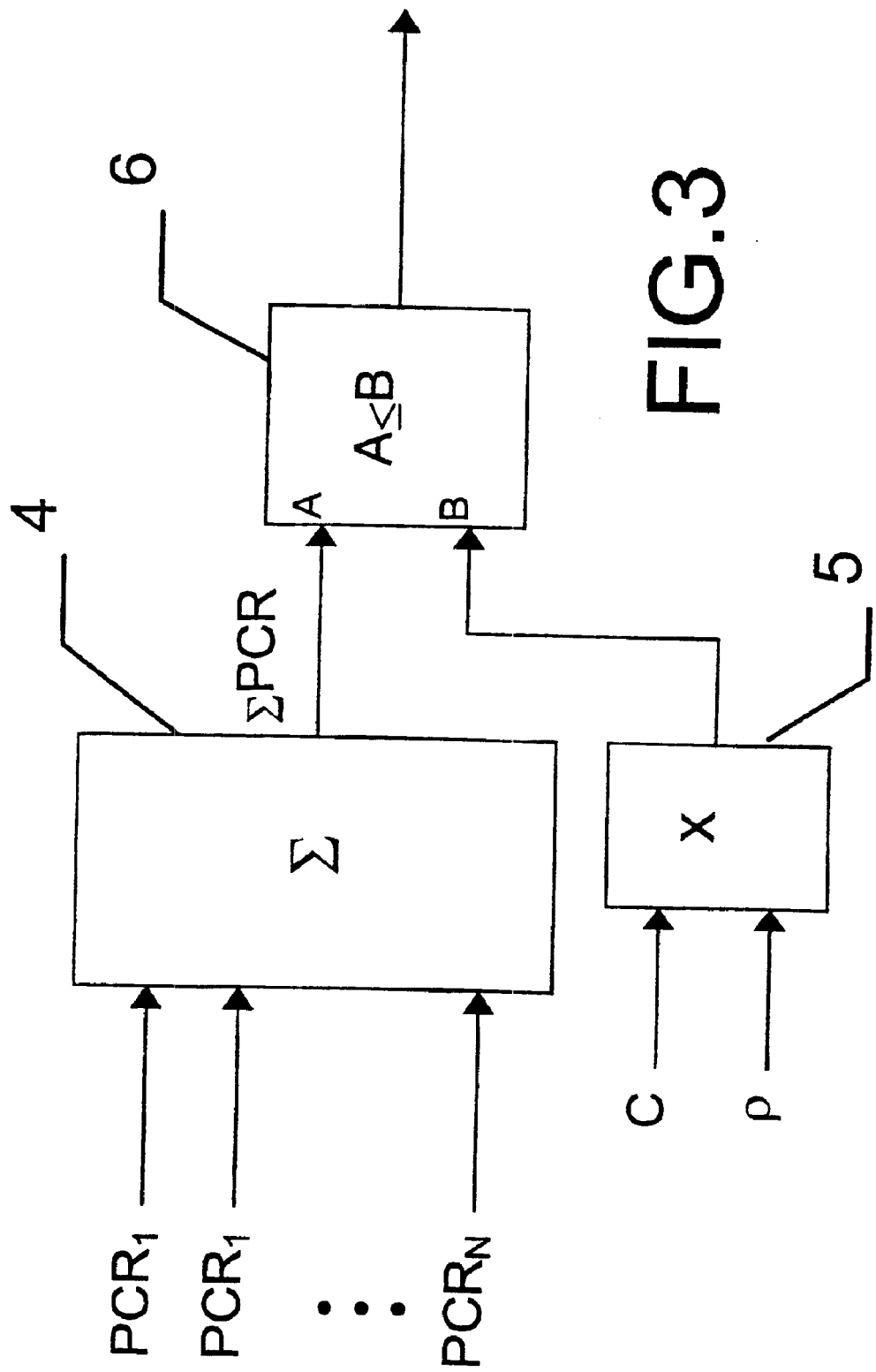
FIG. 3 shows the sub-device 1 of FIG. 2 in greater detail.

FIG. 3 shows sub-device 1 in more detail. The PCR values of the N ATM connections are summed ($\Sigma$PCR) in a device 4. In a device 5, the total capacity C of the output port is multiplied by a previously established coefficient $\rho$ ($0<\rho<1$), corresponding to the desired maximum load. The result of the arithmetic unit 6 is positive if the value of $\Sigma$PCR calculated in device 4 is less than or equal to the product of $\rho \times C$ calculated by device 5; if that is not the case, the result is negative.

Figure 4:
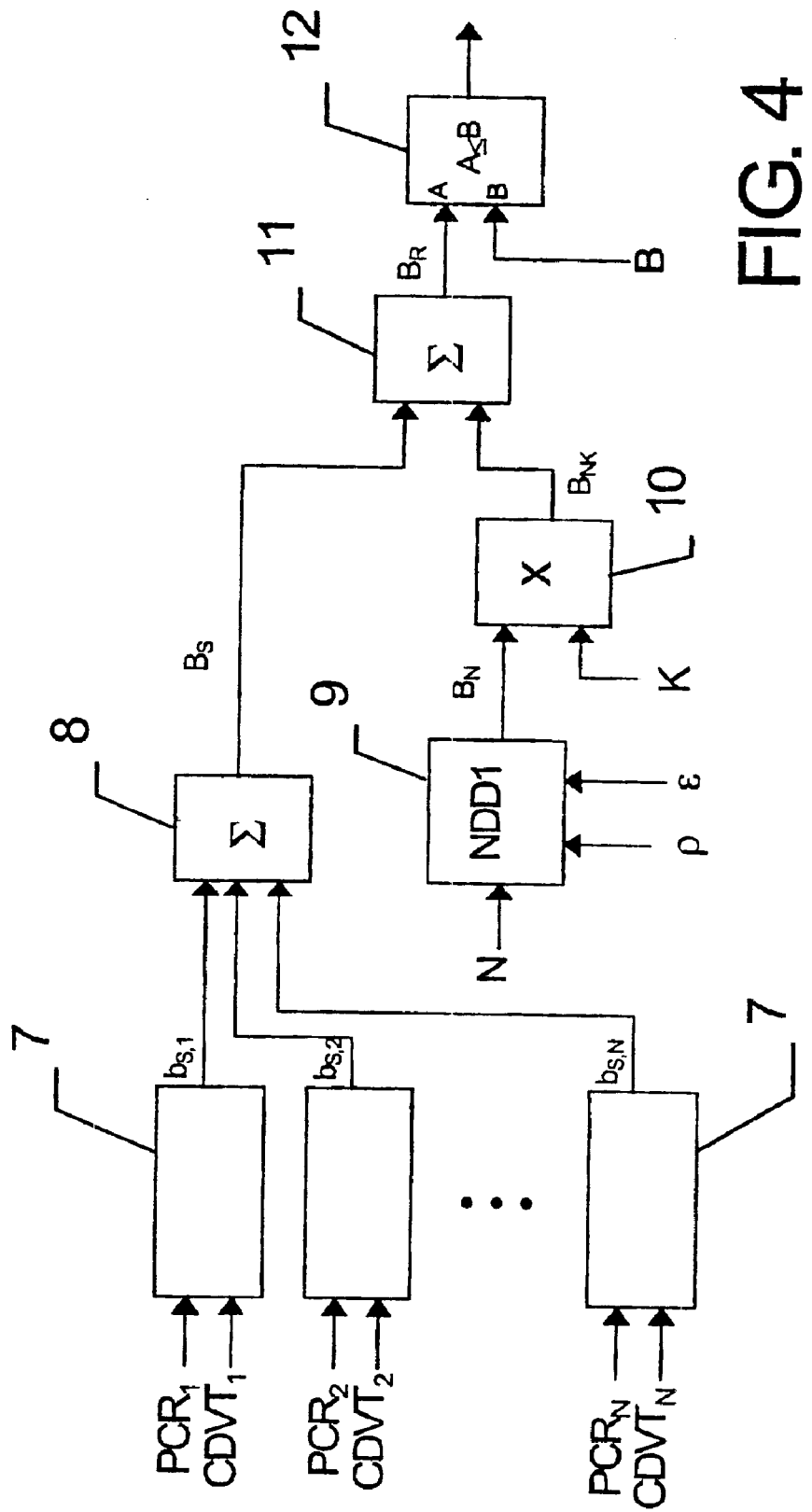
FIG. 4 diagrammatically shows the sub-device of FIG. 2.

FIG. 4 diagrammatically shows the sub-device 2. The traffic parameters of ATM connection i are formed by the entities Peak Cell Rate($PCR_i$) and Cell Delay Variation ($CDVT_i$). For each connection the sub-device 2 comprises a processor 7, which is shown in more detail in FIG. 5. In a device 13 (see FIG. 5), each of the processors 7 calculates by multiplication the maximum burst rate $b_{max,i}$ of the two said traffic parameters. The difference between $b_{max,i}$ and K ($b_{max,i}-K$) is calculated by a device 14. If this difference is 0 or positive, which is verified by a device 15, then $b_{S,i}$ is equal to the calculated difference of $b_{max,i}-K$; if the difference is less than 0, $b_{S,i}$ is equal to 0. Sub-device 2 (see FIG. 4 again) consists of a number of processors 7, one for each ATM connection. The $b_{S,i}$ results of each processor 7 are summed in a device 8 and result in a total value of $B_S$. The total number of ATM connections N is entered in arithmetic module 9. Said module determines the lowest value of B, such that $Q_D^N(B) | < \epsilon$. This results in a value $B_N$. Said value $B_N$ is multiplied by the constant value K in a device 10 and forms the value $B_{NK}$. Finally, a device 11 sums the values of $B_S$ and $B_{NK}$ and a device 12 compares the summed value with the given available buffer size, B. If $B_S+B_{NK}$ is less than or equal to B, then a positive "admit" signal, or otherwise a negative "reject" signal, is emitted.

REFERENCES

[I.371] ITU-T I.371: Traffic Control and Congestion Control in B-ISDN; ITU-T recommendation I.371 (August 1996); Geneva, August 1996.

[E.736] ITU Telecommunication Standardization Sector, Draft Recommendation E.736, "Methods for Cell Level Traffic Control in B-ISDN", 10 Jan. 1997.

[Mign96] J. Mignault, A. Gravey, C. Rosenberg, "A survey of straightforward statistical multiplexing models for ATM networks", Telecommunication Systems 5 (1996) 177–208.

[Grav97] A. Gravey, J. Boyer, K. Sevilla, J. Mignault, Resource Allocation for Worst Case Traffic in ATM networks, Performance Evaluation 30 (1997), 19–43.

[COST242] J. Roberts, U. Mocci, J. Virtamo (eds.), Broadband Network TeleTraffic—performance evaluation and design of broadband multiservice networks—Final Report of Action, COST242, Lecture Notes in Computer Science Vol 1155, Springer-Verlag, Berlin; Heidelberg, 1996, ISBN 3-540-61815-5

[Cidon95] I. Cidon, R. Guerin, I. Kessler and A. Khamisy, Analysis of a statistical multiplexer with generalized periodic sources, Queuing Systems 20 (1995) 139–169.

[I.356] ITU-T I.356: B-ISDN ATM layer cell transfer performance; ITU-T recommendation I.356 (October 1996); Geneva, October 1996.

What is claimed is:

1. A device for Connection Admission Control for an ATM switch, intended for admitting to the switch a requested ATM connection of the DBR type, such that the "Quality of service" of all ATM connections of the DBR type in said switch continues to satisfy certain conditions, in which a single buffer with capacity B is available for the composite traffic stream of DBR connections at an output port with capacity C, while as a boundary condition it holds that a total average load of the output port does not amount to more than $\rho \times C$, where $\rho$ is a constant with a value between 0 and 1, wherein the device comprises two first and second sub-devices which each emit a positive or negative admission signal, admission to the switch only being granted to the new ATM connection if both sub-devices issue a positive admission signal, wherein said first sub-device comprises:

a first arithmetic unit which calculates a sum ($\Sigma$PCR) of nominal traffic parameters Peak cell Rate ($PCR_i$) of each of the ATM connections of the DBR type at a related output port, including a newly requested connection; and a second arithmetic unit which compares the calculated sum ($\Sigma$PCR) with the value of $\rho \times C$, the result of the first sub-device being negative if $\Sigma$PCR is greater than $\rho \times C$, and the result of the first sub-device being positive if $\Sigma$PCR is less than or equal to $\rho \times C$;

and wherein said second sub-device comprises:

for each of the ATM connections of the DBR type at the related output port, including the newly requested connection, a third arithmetic unit, which calculates a buffer capacity $b_{S,i}$, the value of $b_{S,i}$ being equal to zero if the product of the nominal Peak Cell Rate ($PCR_i$) and Cell Delay Variation Tolerance ($CDVT_i$) of the related connection is less than or equal to a constant K, and the value of $b_{S,i}$, being equal to said product minus the value of K if said product is greater than K;

a fourth arithmetic unit which calculates a sum ($B_S$) of the calculated values $b_{S,i}$ for all ATM connections at the related output port;

a fifth arithmetic unit which calculates a buffer capacity $B_N$, such that upon multiplexing of N independent, identical and ideal (CDVT=0) traffic streams, using a single buffer with a buffer capacity of $B_N$, and assuming a maximum link load having a value of $\rho$, the average probability of cell loss as a result of buffer overflow will not exceed a given value of $\epsilon$;

a sixth arithmetic unit which calculates a product ($B_{NK}$) of the value of $B_N$ and the constant value K;

a seventh arithmetic unit which determines a sum ($B_R$) of the calculated values for $B_S$ and $B_{NK}$;

a comparison device which compares the calculated sum $B_R$ with the given capacity B of the output buffer, a positive admission signal being emitted if the value of $B_R$ is less than or equal to B, and a negative admission signal being emitted if the value of $B_R$ is greater than B.

* * * * *